(12) United States Patent
Khaled et al.

(10) Patent No.: US 10,087,806 B2
(45) Date of Patent: Oct. 2, 2018

(54) SELF-TUNING CIRCUIT FOR CONTROLLING INPUT PRESSURE VALUES FOR AN AFTERTREATMENT SYSTEM

(71) Applicant: Cummins Emission Solutions Inc., Columbus, IN (US)

(72) Inventors: Nassim Khaled, Columbus, IN (US); Bibin N. Pattel, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 160 days.

(21) Appl. No.: 15/046,896

(22) Filed: Feb. 18, 2016

(65) Prior Publication Data

US 2017/0241314 A1    Aug. 24, 2017

(51) Int. Cl.
*G06F 19/00*    (2018.01)
*F01N 3/20*    (2006.01)
(Continued)

(52) U.S. Cl.
CPC ........... *F01N 3/208* (2013.01); *F01N 3/2066* (2013.01); *F01N 3/2896* (2013.01);
(Continued)

(58) Field of Classification Search
CPC ............... F01N 11/002; F01N 2390/02; F01N 2900/0402; F01N 2900/1808; F01N 3/208;
(Continued)

(56) References Cited

U.S. PATENT DOCUMENTS

| 5,295,157 A | * | 3/1994 | Suzuki | H04L 25/03038 375/229 |
| 5,307,276 A | * | 4/1994 | Takahashi | F02D 41/047 123/480 |

(Continued)

FOREIGN PATENT DOCUMENTS

WO PCT/US2015/028775    5/2015

OTHER PUBLICATIONS

The International Search Report and Written Opinion issued in PCT/US2015/028775, dated Aug. 5, 2015.

*Primary Examiner* — Marguerite McMahon
*Assistant Examiner* — Tea Holbrook
(74) *Attorney, Agent, or Firm* — Foley & Lardner LLP

(57) ABSTRACT

A controller including a self-tuning circuit for controlling a pressure system to output an input pressure corresponding to an input pressure value using an adaptive fuzzy control system and updating dosing command values of a dosing command table for controlling a dosing unit of an aftertreatment system. The self-tuning circuit is configured to determine an input pressure value and generate a pressure control signal using the adaptive fuzzy control system based on the input pressure value, a detected input pressure, and an error amount. The self-tuning circuit is further configured to regulate the input pressure of reductant to the dosing unit from a reductant tank using a pressure control signal for a pressure control device. The self-tuning circuit is further configured to update a dosing command value of a dosing command table of the controller in conjunction with regulating the input pressure of reductant.

35 Claims, 8 Drawing Sheets

(51) Int. Cl.
*F01N 3/28* (2006.01)
*F01N 11/00* (2006.01)

(52) U.S. Cl.
CPC ........ *F01N 11/002* (2013.01); *F01N 2390/02* (2013.01); *F01N 2610/02* (2013.01); *F01N 2610/144* (2013.01); *F01N 2610/146* (2013.01); *F01N 2610/148* (2013.01); *F01N 2610/1433* (2013.01); *F01N 2610/1453* (2013.01); *F01N 2900/0402* (2013.01); *F01N 2900/0408* (2013.01); *F01N 2900/1808* (2013.01); *F01N 2900/1812* (2013.01); *Y02T 10/24* (2013.01)

(58) Field of Classification Search
CPC .... F01N 3/2896; F01N 11/00; F01N 2550/05; F01N 2900/1812; F01N 3/2066; F02D 41/222; Y02T 10/24; Y02T 10/40; Y02T 10/47
USPC ......... 701/102; 123/568.11, 568.15; 60/39.5, 60/39.511, 286, 299; 73/1.71
See application file for complete search history.

(56) References Cited

U.S. PATENT DOCUMENTS

| | | | |
|---|---|---|---|
| 5,329,803 A | 7/1994 | Booth | |
| 5,487,007 A * | 1/1996 | Suzuki | B62D 6/00 180/422 |
| 5,508,919 A * | 4/1996 | Suzuki | B62D 6/00 180/422 |
| 5,758,025 A * | 5/1998 | Wu | G06N 7/023 706/1 |
| 5,769,314 A * | 6/1998 | Drees | F24F 3/044 165/217 |
| 5,832,896 A * | 11/1998 | Phipps | F02D 31/002 123/352 |
| 5,988,848 A * | 11/1999 | Berstecher | G05B 13/0275 700/28 |
| 6,185,300 B1 * | 2/2001 | Romesburg | H04M 9/08 370/290 |
| 6,405,122 B1 * | 6/2002 | Yamaguchi | F02D 41/1404 701/102 |
| 8,156,729 B2 * | 4/2012 | Sun | F01N 3/0231 60/274 |
| 8,326,505 B2 | 12/2012 | Cesario et al. | |
| 8,834,820 B1 * | 9/2014 | Mowers | F01N 3/208 422/105 |
| 9,617,885 B2 * | 4/2017 | Dyrbusch | F01N 3/10 |
| 2003/0067355 A1 * | 4/2003 | Wojsznis | G05B 13/024 331/2 |
| 2006/0178836 A1 * | 8/2006 | Bai | G06F 19/3437 702/19 |
| 2007/0049188 A1 * | 3/2007 | McCoy | B64D 13/04 454/74 |
| 2009/0070022 A1 * | 3/2009 | Dudek | F02D 41/1406 701/115 |
| 2010/0010215 A1 | 1/2010 | Isaacs et al. | |
| 2010/0101215 A1 * | 4/2010 | Wu | F01N 3/208 60/286 |
| 2010/0212417 A1 * | 8/2010 | Crawford | F01N 3/208 73/114.76 |
| 2011/0283699 A1 * | 11/2011 | Surnilla | F02M 26/05 60/605.2 |
| 2012/0000189 A1 | 1/2012 | Wang et al. | |
| 2013/0152545 A1 * | 6/2013 | Chavannavar | F01N 9/00 60/274 |
| 2014/0053535 A1 * | 2/2014 | Dyrbusch | F01N 3/10 60/274 |
| 2014/0053537 A1 | 2/2014 | Yan et al. | |
| 2014/0074382 A1 * | 3/2014 | Methil-Sudhakaran | F02D 41/1401 701/107 |
| 2015/0066337 A1 * | 3/2015 | Langley | G05B 13/048 701/104 |
| 2015/0104363 A1 * | 4/2015 | Singh | F01N 3/208 423/212 |
| 2015/0218990 A1 * | 8/2015 | Hudgens | F01N 3/2066 423/239.1 |
| 2016/0010529 A1 * | 1/2016 | Wang | F17D 3/00 60/274 |

* cited by examiner

SELF-TUNING CIRCUIT FOR CONTROLLING INPUT PRESSURE VALUES FOR AN AFTERTREATMENT SYSTEM

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing unit that vaporizes or sprays the reductant into an exhaust pipe of the exhaust system up-stream of the catalyst chamber. The SCR system may include one or more sensors to monitor conditions within the exhaust system.

SUMMARY

Implementations described herein relate to a controller having a self-tuning circuit for controlling a pressure system to output an input pressure at an input pressure value using an adaptive fuzzy control system and updating dosing command values of a dosing command table for controlling a dosing unit of an aftertreatment system.

One implementation relates to a system that includes a dosing unit, a reductant tank in fluid communication with the dosing unit, a pressure sensor configured to detect an input pressure of reductant to the dosing unit from the reductant tank, a pressure control device to control the input pressure of reductant to the dosing unit from the reductant tank, and a controller coupled to the dosing unit, the pressure sensor, and the pressure control device. The controller includes a self-tuning circuit that is structured to determine an input pressure value; generate a pressure control signal using an adaptive fuzzy control system based on the input pressure value, the detected input pressure, and an error amount; regulate the input pressure of reductant to the dosing unit from the reductant tank using the pressure control signal for the pressure control device; and update a dosing command value of a dosing command table of the controller in conjunction with regulating the input pressure of reductant.

In some implementations, the controller is operable to control dosing of reductant from the dosing unit based on the dosing command table. In some implementations, the system further includes a second sensor configured to measure an actual amount of dosed reductant by the dosing unit. The self-tuning circuit is further structured to interpret a first parameter indicative of the input pressure of reductant to the dosing unit as substantially equal to the input pressure value, command the dosing unit to dose reductant at a first dosing command rate at the input pressure value based on the dosing command value of the dosing command table, interpret a second parameter indicative of the actual amount of dosed reductant by the dosing unit, and compare the interpreted second parameter indicative of the actual amount of dosed reductant to an expected amount of dosed reductant based on the first dosing command rate. The updating the dosing command value of the dosing command table of the control module of the aftertreatment system is responsive to the comparison of the interpreted second parameter indicative of the actual amount of dosed reductant to the expected amount of dosed reductant. In some implementations, the adaptive fuzzy control system includes a fuzzy inference engine and an adaption system. In some implementations, the adaptive fuzzy control system uses an updated control singleton adapted as:

$$C_i^{updated} = C_i + \mu_{A_i \cap B_{i\_delay}}(x) \times G_p(e + \lambda \dot{e})$$

where $G_p$ is the adaptive learning gain and $\lambda$ is the adaptive learning rate. In some implementations, the self-tuning circuit is further structured to calculate the error amount based on a feedback error. The feedback error may include a current error, a current rate of change of error, a delayed error, and/or a delayed rate of change of error. In some implementations, the pressure control device includes a valve or a pump.

Another implementation relates to a controller for an aftertreatment system. The aftertreatment system includes a dosing unit, a reductant tank in fluid communication with the dosing unit, a pressure sensor configured to detect an input pressure of reductant to the dosing unit from the reductant tank, and a pressure control device to control the input pressure of reductant to the dosing unit from the reductant tank. The controller is coupled to a dosing unit, a pressure sensor, and a pressure control device. The controller includes a self-tuning circuit that is structure to determine an input pressure value; generate a pressure control signal using an adaptive fuzzy control system based on the input pressure value, the detected input pressure, and an error amount; regulate the input pressure of reductant to the dosing unit from the reductant tank using the pressure control signal for the pressure control device; and update a dosing command value of a dosing command table of the controller in conjunction with regulating the input pressure of reductant.

In some implementations, the aftertreatment system further includes a second sensor configured to measure an actual amount of dosed reductant by the dosing unit. The self-tuning circuit is further structured to interpret a first parameter indicative of the input pressure of reductant to the dosing unit as substantially equal to the input pressure value, command the dosing unit to dose reductant at a first dosing command rate at the input pressure value based on the dosing command value of the dosing command table, interpret a second parameter indicative of the actual amount of dosed reductant by the dosing unit, and compare the interpreted second parameter indicative of the actual amount of dosed reductant to an expected amount of dosed reductant based on the first dosing command rate. The updating the dosing command value of the dosing command table of the control module of the aftertreatment system is responsive to the comparison of the interpreted second parameter indicative of the actual amount of dosed reductant to the expected amount of dosed reductant. In some implementations, the adaptive fuzzy control system includes a fuzzy inference engine and an adaption system. In some implementations, the adaptive fuzzy control system uses an updated control singleton adapted as:

$$C_i^{updated} = C_i + \mu_{A_i \cap B_{i\_delay}}(x) \times G_p(e + \lambda \dot{e})$$

where $G_p$ is the adaptive learning gain and $\lambda$ is the adaptive learning rate. In some implementations, the self-tuning circuit is further structured to calculate the error amount based on a feedback error that may include a current error, a current rate of change of error, a delayed error, and/or a delayed rate of change of error. In some implementations, the pressure control device includes a valve or a pump.

Yet a further implementation relates to a method for tuning of a dosing unit using a self-tuning circuit of a controller. The method includes determining an input pressure value and generating a pressure control signal using an adaptive fuzzy control system based on the input pressure value, a detected input pressure of reductant to a dosing unit from a reductant tank, and an error amount. The method also includes regulating an input pressure of reductant to the dosing unit from the reductant tank using the pressure control signal for a pressure control device to control the input pressure of reductant to the dosing unit from the reductant tank. The method further includes updating a dosing command value of a dosing command table of the controller in conjunction with regulating the input pressure of reductant.

In some implementations, the method further includes interpreting a first parameter indicative of the input pressure of reductant to the dosing unit as substantially equal to the input pressure value, commanding the dosing unit to dose reductant at a dosing command rate at the input pressure value based on the dosing command value of the dosing command table stored in a computer readable storage medium of the controller operable to control dosing of reductant from the dosing unit based on the dosing command table, interpreting a second parameter indicative of an actual amount of dosed reductant by the dosing unit from a second sensor, and comparing the interpreted second parameter indicative of the actual amount of dosed reductant to an expected amount of dosed reductant based on the dosing command rate. The updating of the dosing command value of the dosing command table of the controller of an aftertreatment system to an updated dosing command value is responsive to the comparison of the interpreted second parameter indicative of the actual amount of dosed reductant to the expected amount of dosed reductant. In some implementations, the adaptive fuzzy control system includes a fuzzy inference engine and an adaption system. In some implementations, the adaptive fuzzy control system uses an updated control singleton adapted as:

$$C_i^{updated} = C_i + \mu_{A_i \cap B_{i\_delay}}(x) \times G_p(e + \lambda \dot{e})$$

where $G_p$ is the adaptive learning gain and $\lambda$ is the adaptive learning rate. In some implementations, the method further includes calculating the error amount based on a feedback error that includes a current error and a current rate of change of error. In some implementations, the feedback error may also include a delayed error and/or a delayed rate of change of error. In some implementations, the pressure control device includes a valve or a pump.

BRIEF DESCRIPTION

The details of one or more implementations are set forth in the accompanying drawings and the description below.

Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for a self-tuning controller. The various concepts introduced above and discussed in greater detail below may be implemented in any of numerous ways, as the described concepts are not limited to any particular manner of implementation. Examples of specific implementations and applications are provided primarily for illustrative purposes.

I. Overview

For vehicles with controllers for an aftertreatment system, whether the controller and/or a dosing unit is properly configured for the system may affect the overall system performance. For instance, if the dosing unit under-doses reductant to exhaust gas flowing through the exhaust system, excess $NO_x$ emissions may be emitted. Similarly, if the dosing unit over-doses reductant to exhaust gas flowing through the exhaust system, excess ammonia may be emitted (referred to as ammonia slip). Thus, performance tuning can directly affect the overall performance of an aftertreatment system.

In some implementations, a proportional-integral-derivative (PID) controller is used for single-input single-output systems. For adequate controller performance, the controller generally requires at least some initial tuning to work with the system for which the controller is being used. Moreover, such PID controllers may be intended for linear systems, but may also be used for nonlinear systems, which might come at a robustness cost. In some instances, a manufacturer of such controllers may use a tuning process to initially tune the controller once manufactured. However, such initial tuning still requires user intervention and input, even if a subsequent automatic tuning process is implemented. For instance, such controllers include initial doser command value tables that are generated for various operating input pressures and dosing rate commands through initial user input.

Thus, various embodiments discussed herein involve a controller implementing self-tuning logic for automatically performing performance tuning of the controller. The self-tuning controller described herein does not require any initial tuning and can be used for both linear and nonlinear systems. Thus, the self-tuning controller may be implemented into any final system and, based on the logic described herein, can self-tune to the system using the adaptive fuzzy logic described herein.

II. Overview of Aftertreatment System

Figure 1:
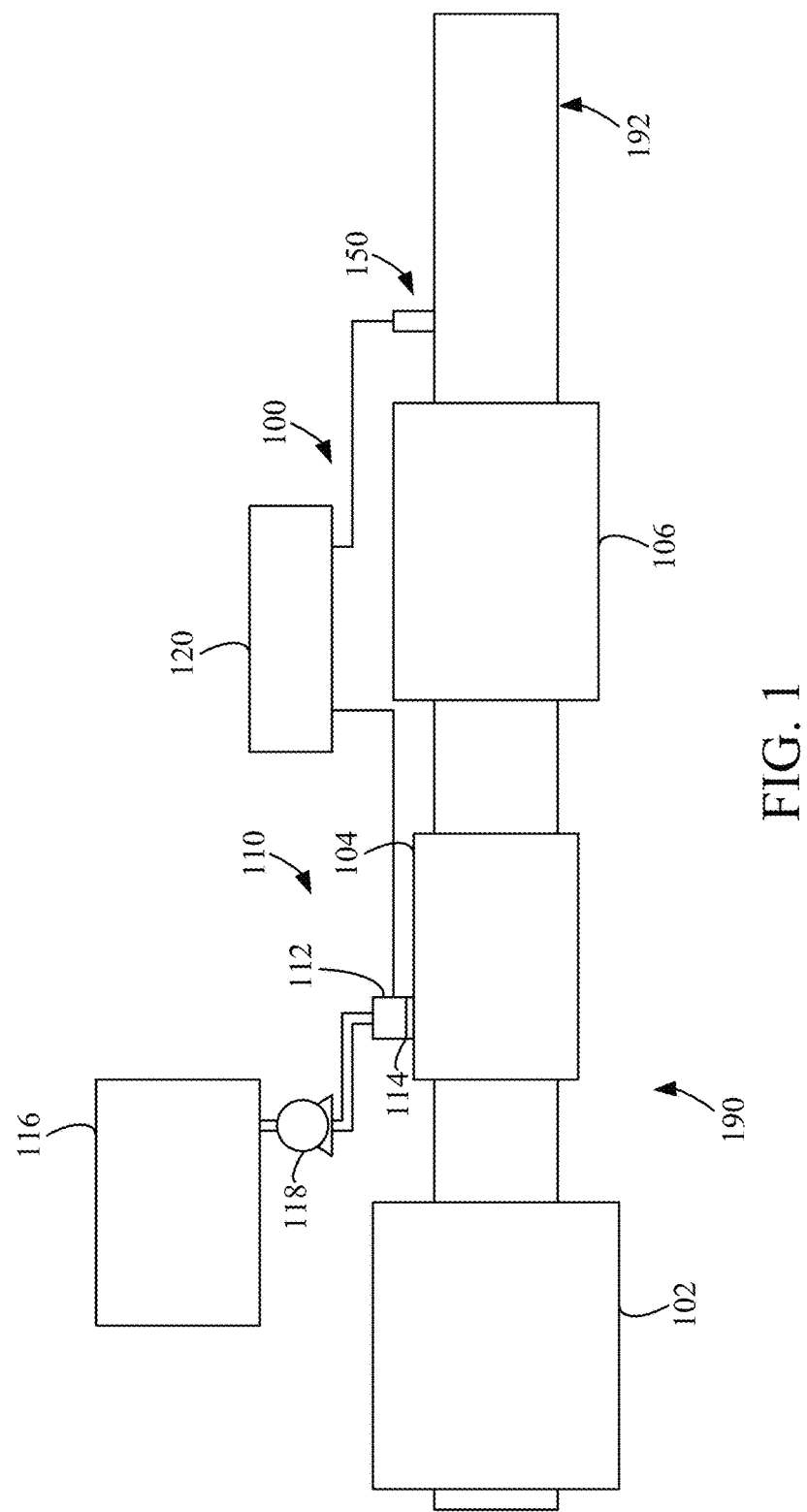
FIG. 1 is a block schematic diagram of an example selective catalytic reduction system having an example reductant delivery system for an exhaust system.

FIG. 1 depicts an aftertreatment system 100 having an example reductant delivery system 110 for an exhaust system 190. The aftertreatment system 100 includes a particulate filter (a diesel particulate filter (DPF) 102 in this example embodiment), the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea or diesel exhaust fluid (DEF), into ammonia. The decomposition chamber 104 includes a reductant delivery system 110 having a dosing unit 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing unit 112 mounted to the decomposition chamber 104 such that the dosing unit 112 may dose the reductant into the exhaust gases flowing in the exhaust system 190. The dosing unit 112 may include an insulator 114 interposed between a portion of the dosing unit 112 and the portion of the decomposition chamber 104 to which the dosing unit 112 is mounted. The dosing unit 112 is fluidly coupled to one or more reductant sources 116. In some implementations, a pump 118 may be used to pressurize the reductant from the reductant source 116 for delivery to the dosing unit 112.

The dosing unit 112 and pump 118 are also electrically or communicatively coupled to a controller 120. The controller 120 is configured to control the dosing unit 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

In certain implementations, the controller 120 is structured to perform certain operations, such as those described herein in relation to FIGS. 4-9. In certain implementations, the controller 120 forms a portion of a processing subsystem including one or more computing devices having memory, processing, and communication hardware. The controller 120 may be a single device or a distributed device, and the functions of the controller 120 may be performed by hardware and/or as computer instructions on a non-transient computer readable storage medium.

In certain implementations, the controller 120 includes one or more circuits structured to functionally execute the operations of the controller 120. In certain implementations, the controller 120 may include a self-tuning circuit for performing the operations described in reference to FIGS. 4-9. The description herein including circuits emphasizes the structural independence of the aspects of the controller 120 and illustrates one grouping of operations and responsibilities of the controller 120. Other groupings that execute similar overall operations are understood within the scope of the present application. Circuits may be implemented in hardware and/or as computer instructions on a non-transient computer readable storage medium, and circuits may be distributed across various hardware or computer based components. More specific descriptions of certain embodiments of controller operations are included in the section referencing FIGS. 4-9.

Example and non-limiting circuit implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the circuit specification, any actuator including at least an electrical, hydraulic, or pneumatic actuator, a solenoid, an op-amp, analog control elements (springs, filters, integrators, adders, dividers, gain elements), and/or digital control elements.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include an oxidation catalyst (and more particularly a diesel oxidation catalyst (DOC)) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit. In some implementations, the dosing unit 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190.

III. Example Self-Tuning Controller

A dosing unit, such as dosing unit 112 of FIG. 1, may be controlled by a controller, such as controller 120. To control the actual amount of dosed reductant, the controller may use a dosing command table having several stored dosing command values. The dosing command values may be one or more parameters having values for controlling one or more aspects of the dosing unit, a pump for an input pressure, and/or other components that affect how reductant is dosed from the dosing unit and/or affecting the input pressure. For instance, an actuator of the dosing unit may be opened and/or closed by varying amounts to selectively control the amount of dosed reductant by the dosing unit. In addition, various valve components may be opened and/or closed to control an amount of reductant cycled through a dosing unit back to a reductant tank. Pressure supply valves may be opened and/or closed to vary an amount of pressure supplied to the dosing unit and/or other portions of a dosing system, such as to pressurize a reductant tank. Still other aspects of the dosing unit and/or other components of a dosing system may be controlled when dosing reductant. Thus, although a final commanded amount of reductant is to be dosed to the aftertreatment system, several components may affect the dosing of reductant.

Figure 2:
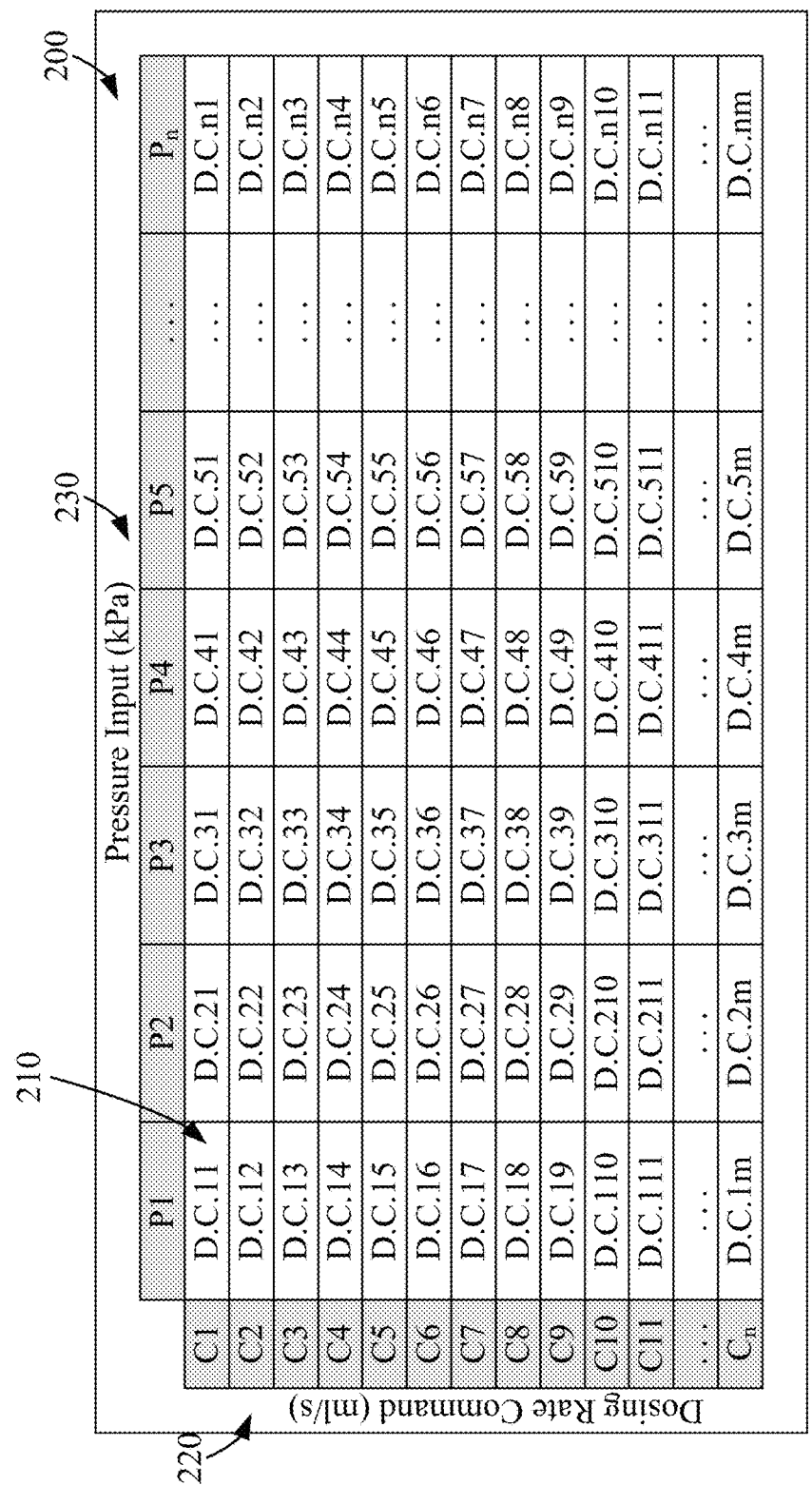
FIG. 2 is an overview of an example dosing command table having several dosing commands based on a corresponding pressure and a commanded dosing rate.

In some implementations, the dosing command table may have several stored dosing command values based on a commanded amount of reductant to be dosed into the aftertreatment system, such as a dosing rate command, and a pressure input value. That is, for a given dosing rate command (e.g., in milliliters of reductant per second) and a given pressure input value, such as the pressure of reductant being delivered to the dosing unit, the dosing command table may store a dosing command value and/or set of values to control the operation of the dosing unit and/or the other components of the dosing system. FIG. 2 depicts an example dosing command table 200 having several dosing command values 210 for various dosing rate commands 220 and pressure input values 230. The predetermined set of dosing rate commands 220 may be set by a manufacturer of the dosing unit and/or may be modified based on the final aftertreatment system of the end user.

The dosing rate commands 220 can be a predetermined set of dosing rate commands. In some implementations, the predetermined set of dosing rate commands may be set based on a zero-dosing rate (i.e., 0 mL/s) to a maximum dosing rate for the dosing unit. The set of dosing rate commands may be a range, such as 0 mL/s to 100 mL/s in 0.1 mL/s increments.

The pressure input values 230 can be a predetermined set of pressure input values. In some implementations, the predetermined set of pressure input values may be set based on a zero pressure input (i.e., 0 kPa) to a maximum pressure input for the dosing unit. The set of pressure input values may be a range, such as 0 kPa to 100 kPa in 0.1 kPa increments. The predetermined set of pressure input values may be set by a manufacturer of the dosing unit and/or may be modified based on the final aftertreatment system of the end user.

The amount of reductant actually dosed from dosing unit and/or the actual dosing rate can vary based on the pressure of the reductant being supplied to the dosing unit, the amount that a dosing nozzle of the dosing unit is open, an amount of reductant being cycled back to a reductant tank, etc. As will be described in greater detail herein, the dosing command table 200 can be populated with dosing command values 210 generated using self-tuning fuzzy logic of the controller that controls the pressure input values 230 of reductant to the dosing unit while tuning the dosing command values 210 for the various dosing rate commands 220. Such tuning can substantially conform the actual amount dosed from the dosing unit to the commanded amount dosed from the dosing unit for the final system into which the dosing unit is integrated by populating the dosing command values 210 of the dosing command table 200 using the self-tuning fuzzy logic to control the input pressure and modifying the dosing command values 210 based on a dosing rate command.

Figure 3:
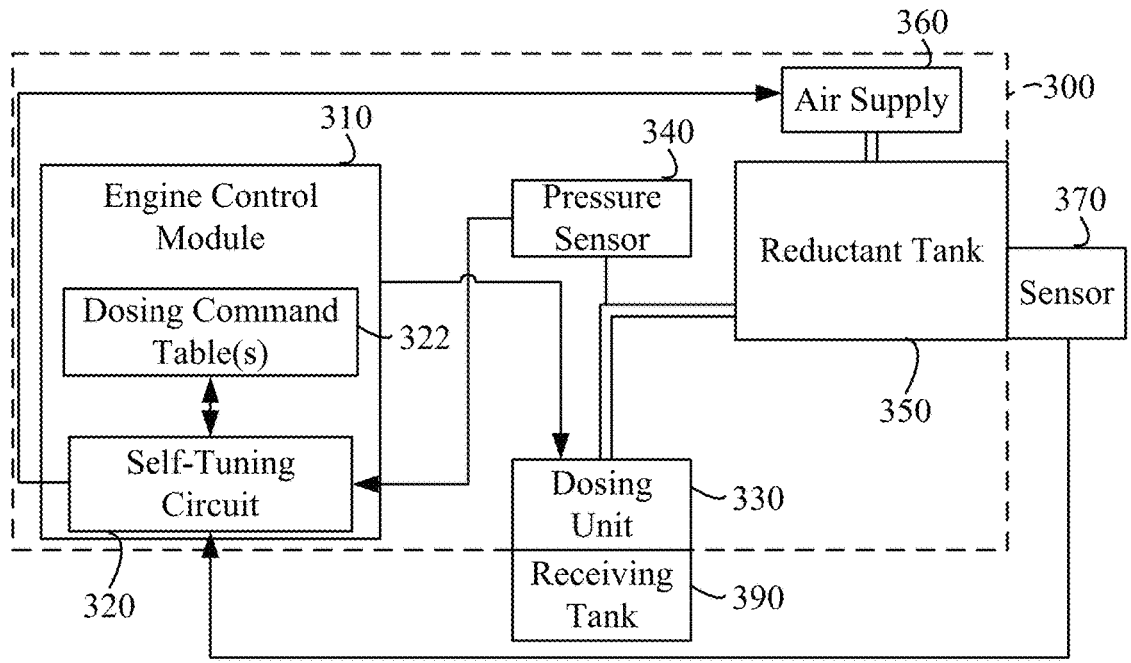
FIG. 3 is a block schematic diagram of an example system having a self-tuning circuit for tuning an engine control module or controller of an aftertreatment system.

FIG. 3 depicts an example portion 300 (outlined in phantom) of an aftertreatment system having an engine control module 310 and/or other controller having a self-tuning circuit 320 for automatically populating and/or tuning the dosing command table 322 for controlling the dosing unit 330 for use with the aftertreatment system. The self-tuning circuit 320 may be incorporated into the engine control module 310 of the aftertreatment system and/or the self-tuning circuit 320 may be a separate circuit in electrical communication with the engine control module 310. The engine control module 310 includes a dosing command table 322, which may be configured in a similar manner to the dosing command table 200 of FIG. 2. The dosing command table 322 can be populated with dosing command values based on a commanded amount of dosed reductant from dosing unit and/or a commanded dosing rate and a pressure input value for the pressure of reductant supplied to the dosing unit 330.

The dosing command table 322 may be populated with dosing command values using the self-tuning circuit 320 to generate dosing command values for various pressure input values and dosing command values. The self-tuning circuit 320 is configured to increment through pressure input values and dosing command values to dose reductant via the dosing unit 330, determine an actual amount of dosed reductant, and modify the dosing command values of the dosing command table 322 based on an expected amount of dosed reductant and an actual amount of dosed reductant. In some implementations, the engine control module 310 may include a dosing control circuit to output control values based on the dosing command values and/or the dosing control circuit may be separate from the engine control module 310. In still further implementations, the self-tuning circuit 320 may be selectively activated, such as when executing the processes 400, 500, 600, 700, 800, and/or 900 of FIGS. 4-9.

The engine control module 310 is electrically coupled to the dosing unit 330 and is configured to control the operation of the dosing unit 330 and/or other components that affect the dosing of reductant from the dosing unit 330. The engine control module 310 may be configured to control the voltage output to the dosing unit 330 and/or other components to control the operation of the dosing unit 330 and/or the other components.

The dosing unit 330 is in fluid communication with a reductant tank 350 that stores reductant to be dosed via the dosing unit 330. In some implementations, the reductant tank 350 is in fluid communication with a pressure supply 360 to pressurize the reductant tank 350 and the reductant therein. The pressure supply 360 may be an adjustable air supply to selectively control the pressure of air supplied to the reductant tank 350. In other implementations, a pump, such as pump 118 of FIG. 1, may pressurize reductant from the reductant tank 350 for the dosing unit 330.

The engine control module 310 is also configured to interpret a parameter indicative of a value for the pressure measured by a pressure sensor 340 of an inlet to the dosing unit 330. In some implementations, the parameter indicative of the value for the pressure measured by the pressure sensor 340 may be directly received by the engine control module 310 or may be read from a data storage, such as a memory module.

During operation of the aftertreatment system, the engine control module 310 may determine, interpret, and/or receive a value for an amount of reductant to be dosed into exhaust gas flowing through an exhaust system of the aftertreatment system. For instance, in some implementations, the engine control module 310 may perform a feed-forward calculation for the amount of $NO_x$ that will be present in the exhaust gas of the exhaust system based on the operating conditions of an engine and the engine control module 310 then calculates the amount of reductant to be dosed to treat the $NO_x$ in the exhaust gas. In other instances, the engine control module 310 may interpret a parameter from a $NO_x$ sensor indicative of an amount of $NO_x$ in the exhaust gas and can then calculate the amount of reductant to be dosed to treat the $NO_x$ in the exhaust gas. In other implementations, the amount of reductant to be dosed may be calculated by a separate module and/or retrieved from a data storage, such as a memory, such as look-up tables. In some implementations, the amount of reductant to be dosed may include a dosing rate, such as mL/s of reductant, to be dosed by the dosing unit 330. The engine control module 310 interprets the parameter indicative of the value for the pressure measured by the pressure sensor 340 and, using the amount of reductant to be dosed and/or the reductant dosing rate, determines a dosing command value or values from the dosing command table 322 to output to the dosing unit 330 and/or other components to control the dosing of reductant. Thus, the engine control module 310 can control the dosing of reductant into the exhaust gas of an exhaust system of the aftertreatment system.

However, for the engine control module 310 to accurately control the dosing of reductant, the dosing command table 322 must be populated with dosing command values to accurately control the dosing of reductant from the dosing unit 330. Thus, the self-tuning circuit 320 is configured to populate the dosing command table 322 with dosing command values by incrementing through pressure input values and dosing rate commands to determine dosing command values. The self-tuning circuit 320 establishes the dosing command values by determining whether an actual amount of dosed reductant corresponds to an expected amount of dosed reductant. If the actual amount of dosed reductant is greater than or less than the expected amount of dosed reductant, the self-tuning circuit 320 is configured to modify the dosing command value or values of the dosing command table 322. The self-tuning circuit 320 includes adaptive fuzzy logic to maintain the input pressure at a desired pressure input value while tuning the dosing command values of the dosing command table 322.

The self-tuning circuit 320 is configured to control the pressurization of the reductant tank 350 and/or the pressure of reductant from the reductant tank 350 to the dosing unit 330 based on a pressure control loop, as will be described in greater detail herein in reference to FIGS. 6-9. In some implementations, the self-tuning circuit 320 may be electrically coupled to a valve from the pressure supply 360 to the reductant tank 350 to selectively open and/or close the valve to increase and/or decrease a pressure of the reductant tank 350, thereby increasing and/or decreasing the pressure measured by the pressure sensor 340. In other implementations, the self-tuning circuit 320 may be electrically coupled to a pump, either a pressure supply pump and/or a reductant pump, to increase and/or decrease the pressure of reductant supplied to the dosing unit 330 and measured by the pressure sensor 340.

The self-tuning circuit 320 is also configured to interpret a parameter from a sensor 370 that is indicative of an actual amount of dosed reductant from the dosing unit 330. In some implementations, the sensor 370 may be a scale or other weight measuring sensor that measures the weight of the reductant tank 350, including the reductant therein. The sensor 370 may be calibrated to offset the weight of the empty reductant tank 350 such that the value output from the sensor 370 is the weight of the reductant within the reductant tank 350. In other implementations, the sensor 370 may be a scale or other weight measuring sensor that measures the weight of a receiving tank 390 into which the dosing unit 330 doses reductant. The sensor 370 may be calibrated to offset the weight of the empty receiving tank 390 such that the value output from the sensor 370 is the weight of the reductant within the receiving tank 390. In still other implementations, the sensor 370 may be a flow meter positioned between and in fluid communication with the reductant tank 350 and the dosing unit 330 such that the flow meter measures the rate of volumetric flow from the reductant tank 350 to the dosing unit 330. In still further implementations, the sensor 370 may be a volumetric measurement sensor, such as a float ball or other volumetric measurement device to measure the volume of reductant in the reductant tank 350 and/or receiving tank 390. Still other sensors 370 configured to measure an amount of dosed reductant from the dosing unit 330 may be used.

When the self-tuning circuit 320 is used for initially tuning of the engine control module 310 and dosing unit 330, the self-tuning circuit 320 may set an initial pressure input value to a first incremental value and set an initial dosing rate command to a first incremental dosing rate command. In some implementations, a first dosing command value or set of values may be used to dose reductant. The first dosing command value or set of values may be an arbitrary value (e.g., a static value or random value) and/or a pre-populated value in the dosing command table 322. The self-tuning circuit 320 controls the pressurization of the reductant tank 350 and/or the pressure of reductant from the reductant tank 350 to the dosing unit 330 to be at the first incremental pressure value as measured by the pressure sensor 340. The engine control module 310 operates the dosing unit 330 and/or other components to dose reductant based on the dosing command value or values. In some implementations, the self-tuning circuit 320 may cause the engine control module 310 to dose reductant for a predetermined period of time (e.g., one second) or for a predetermined volume of reductant (e.g., 10 mL of dosed reductant). The sensor 370 measures the actual amount of dosed reductant from the dosing unit 330 and the self-tuning circuit 320 interprets the value of the parameter indicative of the measured actual amount of dosed reductant. The self-tuning circuit 320 compares the actual amount of dosed reductant from the dosing unit 330 to an expected amount of reductant to be dosed. If the actual amount of dosed reductant is greater than or less than the expected amount of dosed reductant, the self-tuning circuit 320 is configured to modify the dosing command value or values of the dosing command table 322 until the actual amount of dosed reductant is equal or substantially equal (e.g., within a predetermined error percentage, such as 1%, 2%, 5%, etc., or a predetermined tolerance value, such as ±0.01 mL, ±0.05 mL, ±0.1 mL, etc. The operation of the self-tuning circuit 320 will be described in greater detail in reference to FIGS. 4-8.

In some implementations, a pump (not shown) may be in fluid communication with the receiving tank 390 and the reductant tank 350 to pump reductant from the receiving tank 390 to the reductant tank 350 during the tuning. In some implementations, a valve between the pump and the reductant tank 350 may be selectively opened and/or closed by the self-tuning circuit 320 to fluidly seal the pump from the reductant tank 350, such as when the reductant tank 350 is to be pressurized.

Figure 4:
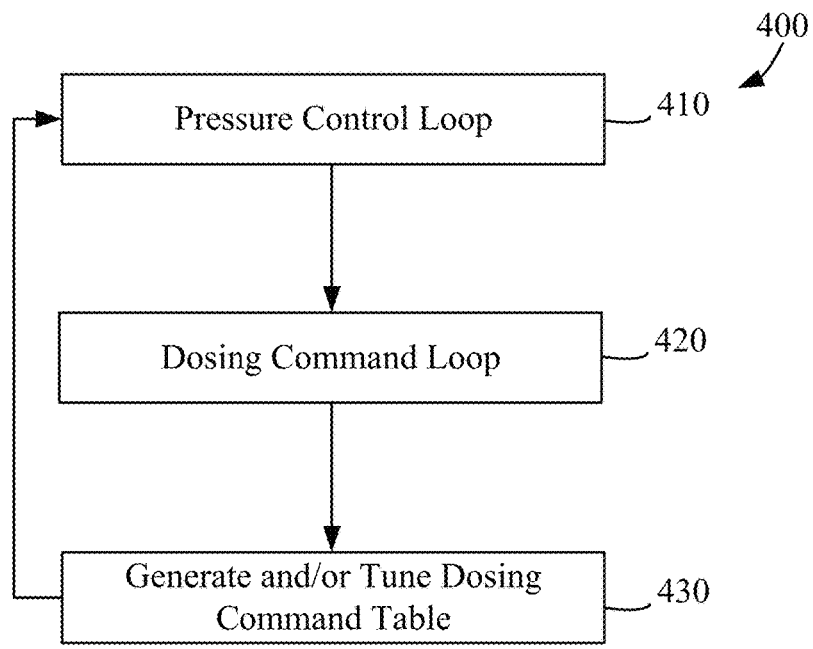
FIG. 4 is a process diagram depicting an example process for a self-tuning circuit to generate and/or tune dosing command values for a dosing command table by controlling the input pressure using a pressure control loop and modifying dosing command values using a dosing command loop.

FIG. 4 depicts an overview of a process 400 implemented by the self-tuning circuit 320 to generate dosing command values for a dosing command table. The process 400 includes a pressure control loop 410 that controls and increments an input pressure value, a dosing command loop 420 that increments through dosing rate commands for each input pressure value and modifies dosing command values based on an actual amount of dosed reductant relative to an expected amount of dosed reductant, and a generation of a dosing command table 430 process that generates a dosing command table populated with dosing command values for each input pressure vale and dosing rate command. The pressure control loop 410 will be described in greater detail in reference to FIGS. 6-9. The dosing command loop 420 will be described in greater detail in reference to FIGS. 5 and 9. The generation of the dosing command table 430 process populates a dosing command table, such as dosing command table 322 of FIG. 3, with one or more parameter values for controlling one or more aspects of the dosing unit, a pump, and/or other components that affect how reductant is dosed from the dosing unit and/or the input pressure.

Figure 5:
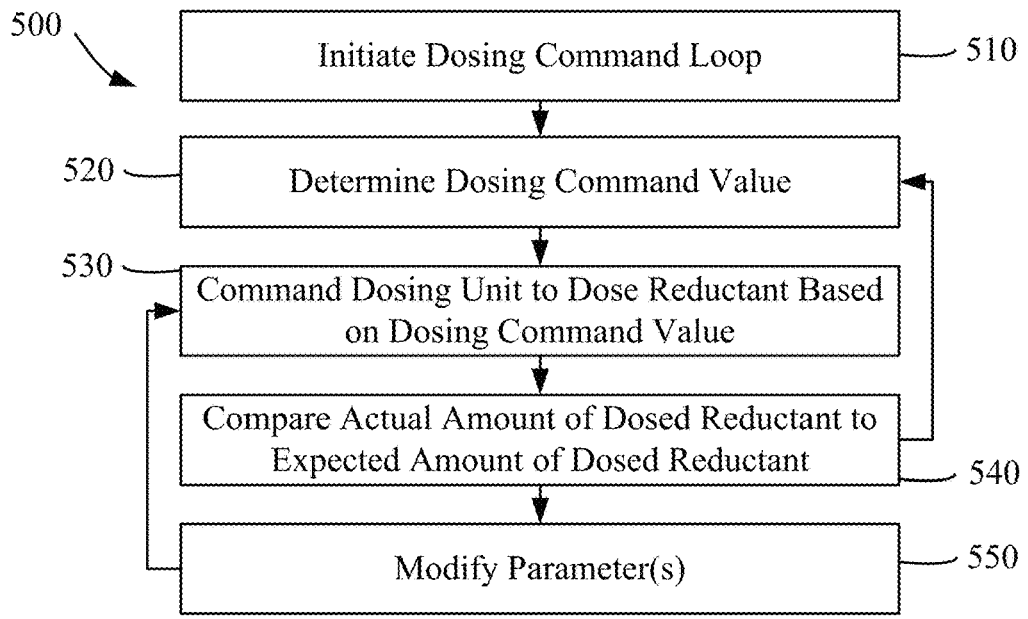
FIG. 5 is a process diagram depicting an example process for a self-tuning circuit to modify dosing command values for a dosing unit.

FIG. 5 depicts an example process 500 that may be implemented by the self-tuning circuit 320 of FIG. 3 for the dosing command loop 420 of FIG. 4 to automatically tune the performance of the engine control module 310 and/or dosing unit 330 based on an incremental input pressure value from the pressure control loop 410. The process 500 includes initiating dosing command loop (block 510). The self-tuning circuit 320 is incorporated in and/or communicatively coupled to the engine control module 310 such that the self-tuning circuit 320 can control and/or modify the dosing command values of the dosing command table 322. In some implementations, the self-tuning circuit 320 can be communicatively coupled to the pressure sensor 340 and/or the sensor 370 to interpret parameters indicative of the pressure of the reductant being delivered to the dosing unit 330 and/or the actual amount of dosed reductant from the dosing unit 330. In other implementations, the self-tuning circuit 320 may be configured to access and interpret parameters indicative of the pressure of the reductant being delivered to the dosing unit 330 and/or the actual amount of dosed reductant from the dosing unit 330, such as from a memory or other storage device. The self-tuning circuit 320 can be further communicatively coupled to a component to control the pressurization of the reductant tank 350 and/or the pressure of reductant from the reductant tank 350 to the dosing unit 330, such as to a pressure supply pump, a valve regulating a pressure supply to the reductant tank 350, a pump between the reductant tank 350 and the dosing unit 330, etc., as will be described in greater detail herein in reference to FIGS. 6-9.

The initiation of the dosing command loop (block 510) may include setting a flag in the engine control module 310 to indicate that the engine control module 310 is in a dosing unit calibration mode. The initiation of the dosing unit calibration may also include making the dosing command table or tables editable.

The process 500 also includes determining a dosing command value (block 520). The determination of the dosing command value is based on the dosing command table or tables. In some implementations, the determination of the dosing command value may start at an initial dosing command value of the dosing command table corresponding to a first incremental dosing rate command and a first incremental input pressure value (e.g., "D.C.11" of the dosing command table 200 of FIG. 2 that corresponds to the first dosing command rate "C1" and the first input pressure value "P1").

The process 500 also includes commanding a dosing unit to dose reductant based on the determined dosing command value (block 530). In some implementations, the self-tuning circuit 320 may cause the engine control module 310 to command the dosing unit 330 to dose reductant based on the dosing command value. That is, the self-tuning circuit 320 may cause the engine control module 310 to output the dosing command value or values (e.g., control voltages, etc.) to cause the dosing unit 330 to dose reductant at the corresponding expected dosing command rate and at the corresponding input pressure value. The self-tuning circuit 320 may control the input pressure value by controlling an outside pressure supply pump, a valve between the outside pressure supply and the reductant tank 350, and/or a pump between the reductant tank 350 and the dosing unit 330, as will be described in greater detail herein in reference to FIGS. 6-9. Thus, the self-tuning circuit 320 can maintain the input pressure at a pressure corresponding to the input pressure value for the corresponding dosing command value. In some implementations, the self-tuning circuit 320 may cause the dosing unit 330 (either directly or via the engine control module 310) to dose reductant for a predetermined period of time, such as one second, or for a predetermined volume, such as 10 mL, based on the expected dosing rate from the dosing command table.

The process 500 further includes comparing an actual amount of dosed reductant to an expected amount of dosed reductant (block 540). The actual amount of dosed reductant can be determined by interpreting a parameter indicative of the actual amount of dosed reductant by the self-tuning circuit 320. For instance, the self-tuning circuit 320 interprets a parameter from a sensor 370 that is indicative of the actual amount of dosed reductant from the dosing unit 330. The sensor 370 may be a weight measuring sensor, such as a scale, that measures the weight of the reductant tank 350 and/or receiving tank 390. In some implementations, the sensor 370 may be a flow meter positioned between and in fluid communication with the reductant tank 350 and the dosing unit 330 such that the flow meter measures the rate of volumetric flow from the reductant tank 350 to the dosing unit 330. In still further implementations, the sensor 370 may be a volumetric measurement sensor, such as a float ball or other volumetric measurement device to measure the volume of reductant in the reductant tank 350 and/or receiving tank 390. Still other sensors 370 configured to measure an amount of dosed reductant from the dosing unit 330 may be used.

The expected amount of dosed reductant can be the expected amount of dosed reductant if a predetermined volume, such as 10 mL, is used. In other implementations, the expected amount of dosed reductant can be calculated based on the predetermined period of time, such as one second, and the dosing rate command of the dosing command table.

The self-tuning circuit 320 compares the actual amount of dosed reductant to the expected amount of dosed reductant. If the actual amount of dosed reductant is greater than or less than the expected amount of dosed reductant, then the process 500 proceeds to modify a parameter (block 550) to modify the dosing command value of the dosing command table. If the actual amount of dosed reductant is substantially the same as the expected amount of dosed reductant (e.g., within a predetermined percentage and/or tolerance), then the process 500 returns to determining the next dosing command value (block 520), such as incrementing to the next dosing command value of the dosing command table. In some implementations, the dosing command value may be written to an updated dosing command table to preserve the original dosing command table. In some implementations, the comparison of the actual amount of dosed reductant to the expected amount of dosed reductant (block 540) may determine whether the absolute difference between the two values is below an acceptable error amount. Thus, even if there is some error between the expected amount of dosed reductant and the actual amount of dosed reductant, the process 500 does not loop through modifying parameters to obtain an exact match.

The modification of a parameter or parameters (block 550) may include modifying a dosing command value and/or a parameter affecting the dosing of reductant from the dosing unit 330. For instance, the modification of the parameter may correspond to modifying a parameter that controls the size of an opening through a dosing nozzle of the dosing unit 330, such as a parameter for a voltage that actuates an actuator of the dosing unit 330. In other implementations, the modification of the parameter may correspond to modifying a parameter that controls a valve component to modify an amount of reductant cycled through the dosing unit 330 back to the reductant tank 350. Still other parameters may be modified that affect the dosing of reductant from the dosing unit 330. In some implementations, the modification of the parameter may be based on a machine learning algorithm that updates the tuning in real-time based on empirical measurements. The updated dosing command value based on the modified parameter can overwrite the prior dosing command value of the dosing command table and/or may be saved to an updated dosing command table.

In some implementations, the process 500 may be applied for a static dosing command table and/or dynamic dosing command table. In some implementations, the process 500 may also determine if the reductant tank 350 is empty and/or the stored reductant is below a predetermined volume, such as comparing the aggregated amounts of dosed reductant to the starting volume and/or a predetermine volume of reductant in the reductant tank 350. If the stored reductant is below the predetermined volume and/or the reductant tank 350 is empty, the process 500 may pause the tuning and pump reductant from the receiving tank 390 to the reductant tank 350, thereby allowing the system to restore itself back into a correct tuning state.

Figure 6:
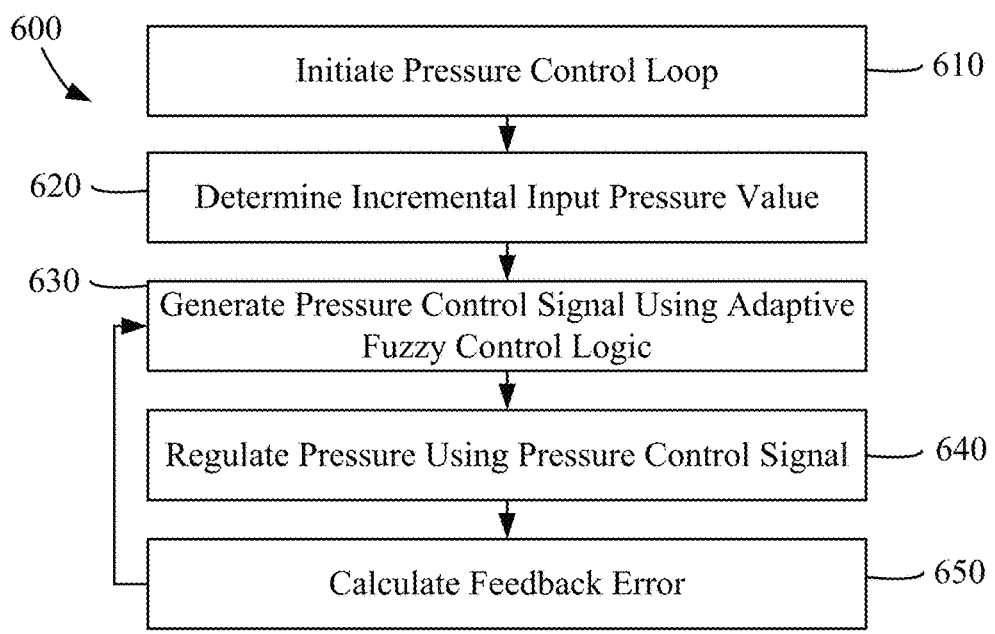
FIG. 6 is a process diagram depicting an example process for a self-tuning circuit to control an input pressure using adaptive fuzzy logic while generating and/or tuning dosing command values for a dosing command table.

FIG. 6 depicts an example process 600 that may be implemented by the self-tuning circuit 320 of FIG. 3 for the pressure control loop 410 of FIG. 4 to control the incremental input pressure value using adaptive fuzzy control logic. The process 600 includes initiating the pressure control loop (block 610). In some implementations, the self-tuning circuit 320 can be communicatively coupled to the pressure sensor 340 and/or the sensor 370 to interpret parameters indicative of the pressure of the reductant being delivered to the dosing unit 330 and/or the actual amount of dosed reductant from the dosing unit 330. In other implementations, the self-tuning circuit 320 may be configured to access and interpret parameters indicative of the pressure of the reductant being delivered to the dosing unit 330 and/or the actual amount of dosed reductant from the dosing unit 330, such as from a memory or other storage device. The self-tuning circuit 320 can be further communicatively coupled to a component to control the pressurization of the reductant tank 350 and/or the pressure of reductant from the reductant tank 350 to the dosing unit 330, such as to a pressure supply pump, a valve regulating a pressure supply to the reductant tank 350, a pump between the reductant tank 350 and the dosing unit 330, etc.

The initiation of the pressure control loop (block 610) may include setting a flag in the engine control module 310 to indicate that the engine control module 310 is in a dosing unit calibration mode. The initiation of the dosing unit calibration may also include making the dosing command table or tables editable. In other implementations, the initiation of the pressure control loop (block 610) may be independent of the dosing unit calibration mode. For instance, the pressure control loop may be used to control input pressure values while dosing reductant during normal operation.

The process 600 also includes determining an incremental input pressure value (block 620). The determination of the incremental input pressure value may be based on the dosing command table or tables. In some implementations, the determination of the incremental input pressure value may start at an initial incremental input pressure value of the dosing command table (e.g., a first incremental input pressure value "P1" of the dosing command table 200 of FIG. 2).

The process 600 also includes generating a pressure control signal using adaptive fuzzy control logic (block 630). The pressure control signal may be control signal to control one or more components of a pressure regulating system for regulating the input pressure to be substantially equal to a desired input pressure value. In some implementations, the pressure control signal may be a pulse-width-modulated (PWM) signal for controlling a pressure regulating valve between a pressure source (e.g., an air supply or other pressurized tank) and/or for controlling a pump pressurizing reductant to a dosing unit. The adaptive fuzzy control logic utilizes the current error, the current rate of change of error, the delayed error if there is a transport delay, and the delayed rate of change of error if there is a transport delay as inputs. An updated control signal is calculated using a fuzzy inference engine with an adaption system, as will be described in greater detail in reference to FIG. 8.

The generated pressure control signal is then used to regulate the input pressure value (block 640). The generated pressure control signal may be output to a pressure control device to control or regulate the input pressure of reductant to the dosing unit from the reductant tank. The pressure control device may include a valve or a pump. Based on the regulated input pressure value, the process 600 includes calculating feedback error (block 650), which is used by the adaptive fuzzy control logic to generate an updated pressure control signal.

Thus, process 600 self-tunes the pressure control of the system such that no user intervention is required for the pressure control loop 410. Moreover, the process 600 enables the self-tuning circuit 320 to automatically adjust for different pressure systems and/or where input or output pressures are different. In some implementations, the process 600 may run concurrently with the process 500 of FIG. 5 such that the input pressure value is controlled while the dosing command values are tuned.

Figure 7:
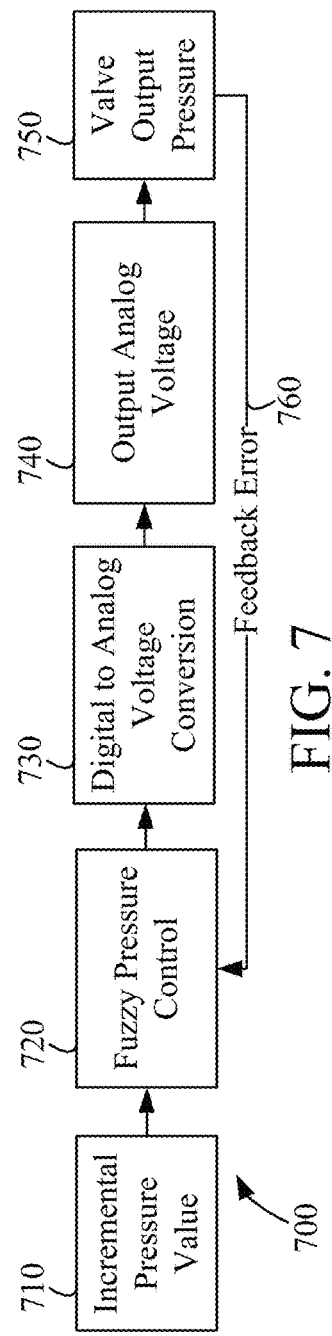
FIG. 7 is a process diagram depicting an example algorithm for regulating a valve output pressure based on adaptive fuzzy logic.

FIG. 7 depicts a process 700 for regulating a valve output pressure based on adaptive fuzzy logic. The process 700 includes accessing an incremental pressure value (block 710). In some implementations, accessing the incremental pressure value may include accessing an incremental input pressure value from a dosing command table or tables. In some implementations, the incremental pressure value (block 710) may also include determining a rate of transition from the current input pressure value to the incremental pressure value.

The process 700 further includes applying an adaptive fuzzy pressure control system (block 720) to generate the pressure control signal. The adaptive fuzzy pressure control system generates an updated pressure control signal based on the desired incremental input pressure value and feedback error 760 of the output pressure. The pressure control signal output from the adaptive fuzzy pressure control system may be a digital pulse-width-modulated (PWM) control signal.

The process 700 includes converting the digital PWM control signal to an analog voltage (block 730) using a digital to analog conversion model. In some implementations, the digital to analog conversion model may be stored in the engine control module and/or another component of the system. The process 700 also outputting the analog voltage (block 740). In some implementations, the analog voltage may be used to regulate a pressure valve, a pump, etc. to control the input pressure.

The process 700 further includes interpreting a valve output pressure value (block 750). In some implementations, interpreting the valve output pressure value may include interpreting a parameter indicative of a value for the pressure measured by a pressure sensor of an inlet to a dosing unit. In some implementations, the parameter indicative of the value for the pressure measured by the pressure sensor may be directly received or may be read from a data storage, such as a memory module.

The process 700 further includes determining an error amount, such as a feedback error 760 and using the feedback error as an input for the adaptive fuzzy pressure control system (block 720) to generate an updated pressure control signal to control a pressure regulation valve.

Figure 8:
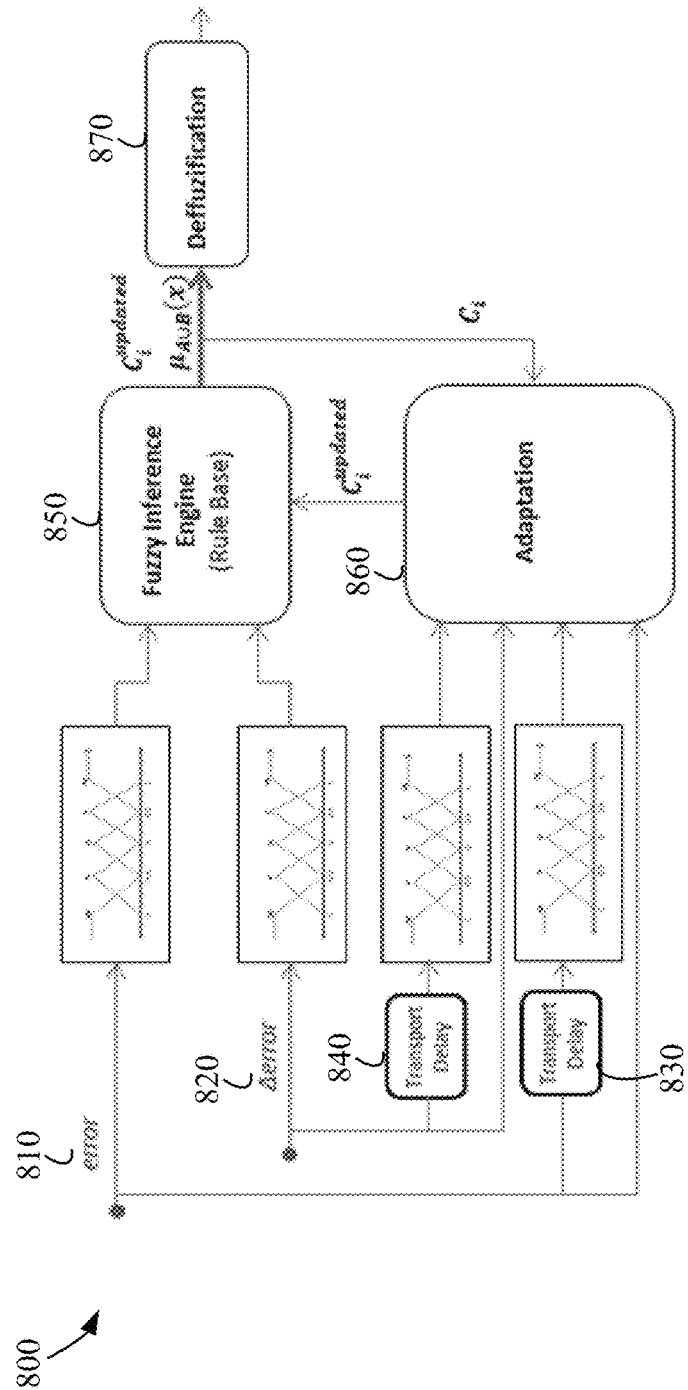
FIG. 8 is a process diagram of an example algorithm for the adaptive fuzzy logic pressure control of FIG. 7.

FIG. 8 depicts an example process 800 for the adaptive fuzzy logic pressure control system 720 of FIG. 7 and the fuzzy control logic of FIG. 6. The process 800 uses the current error (error) 810, the current rate of change of error ($\Delta$error) 820, and an updated control singleton, $C_i^{updated}$, as inputs to a fuzzy inference engine 850 that generates an updated control action. The updated control action is used to generate an updated control signal, such as an updated pressure control signal, after defuzzification 870 of the updated control action. The process 800 also uses the current error (error) 810, the current rate of change of error ($\Delta$error) 820, the delayed error if there is a transport delay (error_delay) 830, and the delayed rate of change of error if there is a transport delay ($\Delta$error_delay) 840 as inputs to the adaption system 860 to generate the updated control singleton, $C_i^{updated}$, based on the current control singleton, $C_i$. If there is no transport delay, then the time for the delayed error (error_delay) 830 and the delayed rate of change of error ($\Delta$error_delay) 840 is set to zero and the output of the membership functions becomes equal.

The adaptation system 860 uses the fuzzy OR function on antecedent results for the delayed inputs 830, 840 with the current error (error) 810 and the current rate of change of error ($\Delta$error) 820 to calculate the updated control singleton to be input to the fuzzy inference engine 850. The updated control singleton is adapted as:

$$C_i^{updated} = C_i + \mu_{A_i \cap B_{i\_delay}}(x) \times G_p(e + \lambda \dot{e})$$

where $G_p$ is the adaptive learning gain and $\lambda$ is the adaptive learning rate.

The updated control signal, U, such as an updated pressure control signal, is computed by defuzzification 870 of the aggregation of all the rule consequents, including the singletons, and the weighted average of the singletons as:

$$U = \frac{\sum_i^n \mu_{A_i \cap B_i} C_i^{updated}}{\sum_i^n \mu_{A_i \cap B_i}}.$$

Figure 9:
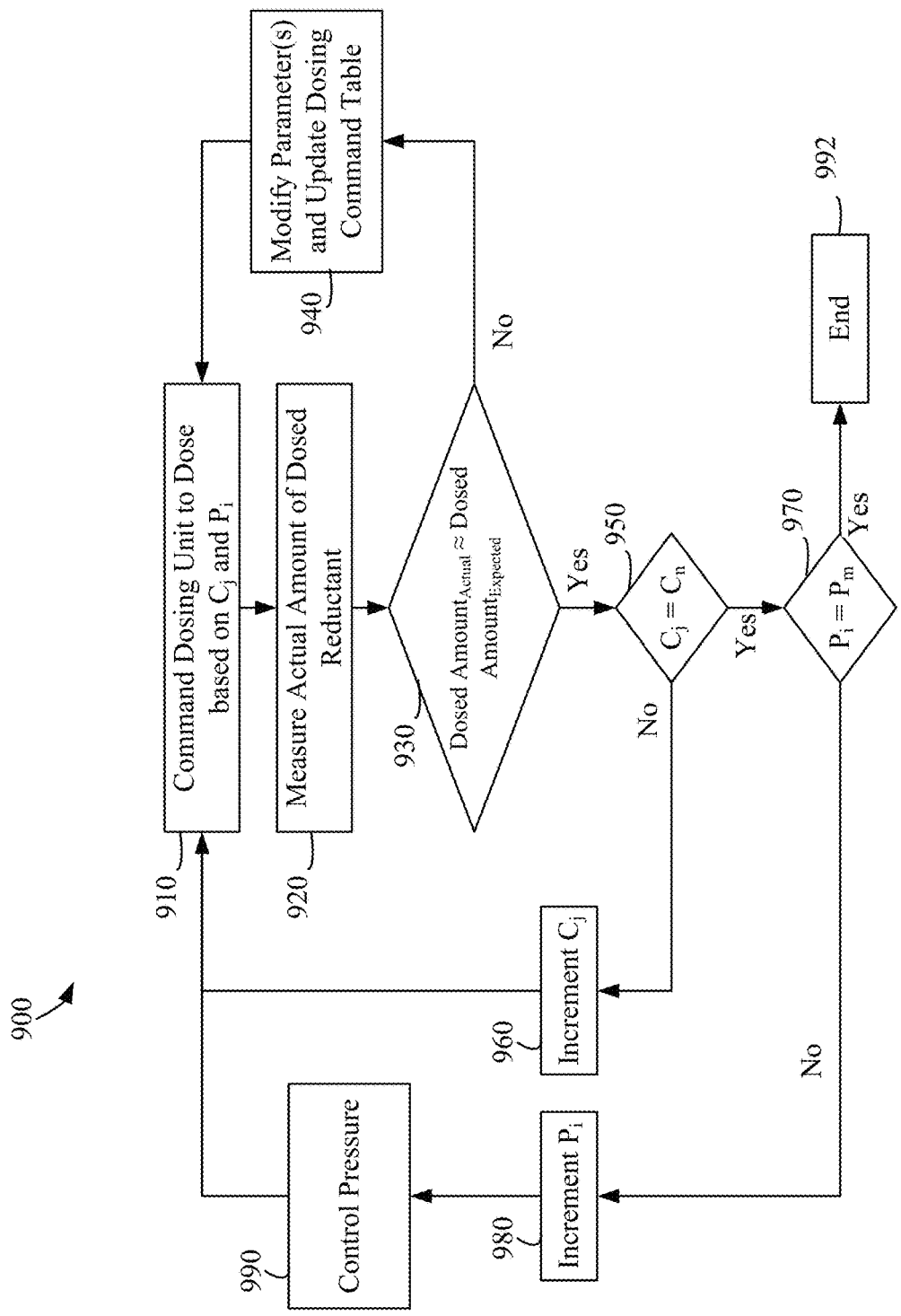
FIG. 9 is a process diagram of an example algorithm for implementing the processes of FIG. 5-6.

FIG. 9 depicts an example process 900 for iterating through dosing command values to tune an engine control module and/or dosing unit while controlling the input pressure. The process 900 may be implemented as part of the process 400 of FIG. 4. The process 900 includes commanding a dosing unit to dose an amount of reductant based on a dosing command rate, $C_j$, and an input pressure value, $P_i$ (block 910). The input pressure value, $P_i$, may be controlled (block 990) using processes 600, 700, 800 of FIGS. 6-8 such that the input pressure value may be controlled using the adaptive fuzzy logic described herein. The dosing command value can be based on a dosing command table or tables, such as dosing command table 200 of FIG. 2. The dosing command value may start at an initial dosing command value of the dosing command table corresponding to a first dosing rate command and a first input pressure value (e.g., "D.C.11" of the dosing command table 200 of FIG. 2 that corresponds to the first dosing command rate "C1" and the first input pressure value "P1"). The commanding of the dosing unit to dose an amount of reductant based on a dosing command rate and an input pressure value may be performed in a similar manner to the commanding a dosing unit to dose reductant based on the determined dosing command value (block 530) described in reference to FIG. 5.

The process 900 includes measuring the actual amount of dosed reductant (block 920). The actual amount of dosed reductant can be determined by interpreting a parameter indicative of the actual amount of dosed reductant by the auto-calibration controller. For instance, the auto-calibration controller can interpret a parameter from a sensor that is indicative of the actual amount of dosed reductant from the dosing unit. The sensor may be a weight measuring sensor, such as a scale, that measures the weight of the reductant tank and/or receiving tank. In some implementations, the sensor may be a flow meter positioned between and in fluid communication with the reductant tank and the dosing unit such that the flow meter measures the rate of volumetric flow from the reductant tank to the dosing unit. In still further implementations, the sensor may be a volumetric measurement sensor, such as a float ball or other volumetric measurement device to measure the volume of reductant in the reductant tank and/or receiving tank.

The process 900 includes determining if the actual amount of dosed reductant, Dosed Amount$_{Actual}$, is equal or substantially equal to the expected amount of dosed reductant, Dosed Amount$_{Expected}$, (block 930). In some implementations, the comparison of the actual amount of dosed reductant to the expected amount of dosed reductant may determine whether the difference between the two values is below an acceptable error amount, such as ±5%, ±1%, ±0.1%, etc. Thus, even if there is some error between the expected amount of dosed reductant and the actual amount of dosed reductant, the process 900 does not loop through to obtain an exact match.

If the actual amount of dosed reductant is not equal, substantially equal, or below the acceptable error amount relative to the expected amount of dosed reductant, then the process 900 proceeds to modifying one or more parameters and updating a dosing command table (block 940). The modification of a parameter or parameters may include modifying a dosing command value and/or a parameter affecting the dosing of reductant from the dosing unit. For instance, the modification of the parameter may correspond to modifying a parameter that controls the size of an opening through a dosing nozzle of the dosing unit, such as a parameter for a voltage that actuates an actuator of the dosing unit. In other implementations, the modification of the parameter may correspond to modifying a parameter that controls a valve component to modify an amount of reductant cycled through the dosing unit back to the reductant tank. Still other parameters may be modified that affect the dosing of reductant from the dosing unit. In some implementations, the modification of the parameter may be based on a machine learning algorithm that updates the tuning in real-time based on empirical measurements. The updating of a dosing command table may include overwriting a prior value with the updated dosing command value based on the modified parameter(s) and/or the modified parameter(s). In other implementations, an updated dosing command table may be generated and the updated dosing command value based on the modified parameter(s) and/or the modified parameter(s) may be saved to the updated dosing command table.

If the actual amount of dosed reductant is equal, substantially equal, or below the acceptable error amount relative to the expected amount of dosed reductant (block 930), then the process 900 determines whether the dosing command rate, $C_j$, is the last dosing command rate, $C_n$, of the dosing command table (block 950) and/or another predetermined ending dosing command rate for the process 900. If the dosing command rate, $C_j$, is not the last dosing command rate, $C_n$, then the process 900 increments the index value (i.e., j=j+1) for the dosing command rate, $C_j$ (block 960) and returns to command the dosing unit to dose based on a dosing command value from the dosing command table based on the incremented dosing command rate (block 910).

In some implementations, the incrementing of the dosing command rate, $C_j$, (block 960) may be based on the comparison of the actual amount of dosed reductant to the expected amount of dosed reductant (block 930). For instance, if the actual amount of dosed reductant is equal or substantially equal to the expected amount of dosed reductant, e.g., within ±0.1%, then the dosing command rate, $C_j$, may be incremented by 5, 10, etc., thereby reducing the number of iterations if the actual amount of dosed reductant is equal or substantially equal to the expected amount of dosed reductant.

If the dosing command rate, $C_j$, is the last dosing command rate, $C_n$, of the dosing command table (block 950), then the process 900 proceed to determining if the input pressure value, $P_i$, is the last input pressure value, $P_m$, of the dosing command table (block 970) and/or another predetermined ending input pressure value for the process 900. If the input pressure value, $P_i$, is not the last input pressure value, $P_m$, then the process 900 increments the index value (i.e., i=i+1) for the input pressure value, $P_i$ (block 980) and proceeds to control the pressure (block 990) using the using adaptive fuzzy logic described in reference to process 600, 700, 800 of FIGS. 6-8. Once the incremented input pressure value, $P_i$, is established, then the process 900 then returns to command the dosing unit to dose based on a dosing command value from the dosing command table based on the incremented input pressure value (block 910).

If the input pressure value, $P_i$, is the last input pressure value, $P_m$, of the dosing command table (block 970), then the process 900 may proceed to end (block 992).

In some implementations, the determination and incrementing of the dosing command rate and input pressure values (blocks 950, 960 and blocks 970, 980) may be interchanged.

Figure 10:
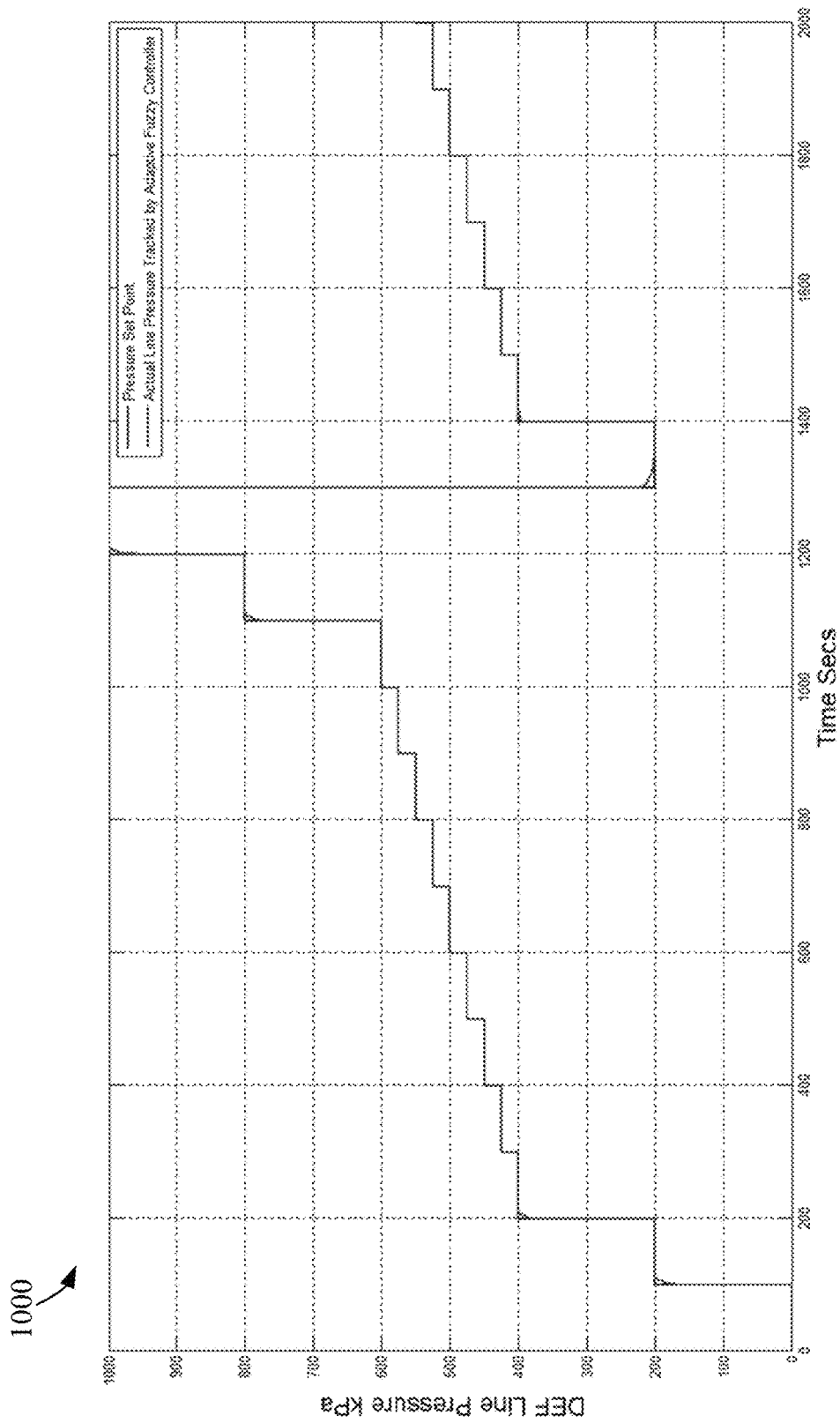
FIG. 10 is a graphical diagram of a reductant line pressure over time for incremental pressure input values and actual pressure values using the adaptive fuzzy control system of FIGS. 6-8.
Figure 11:
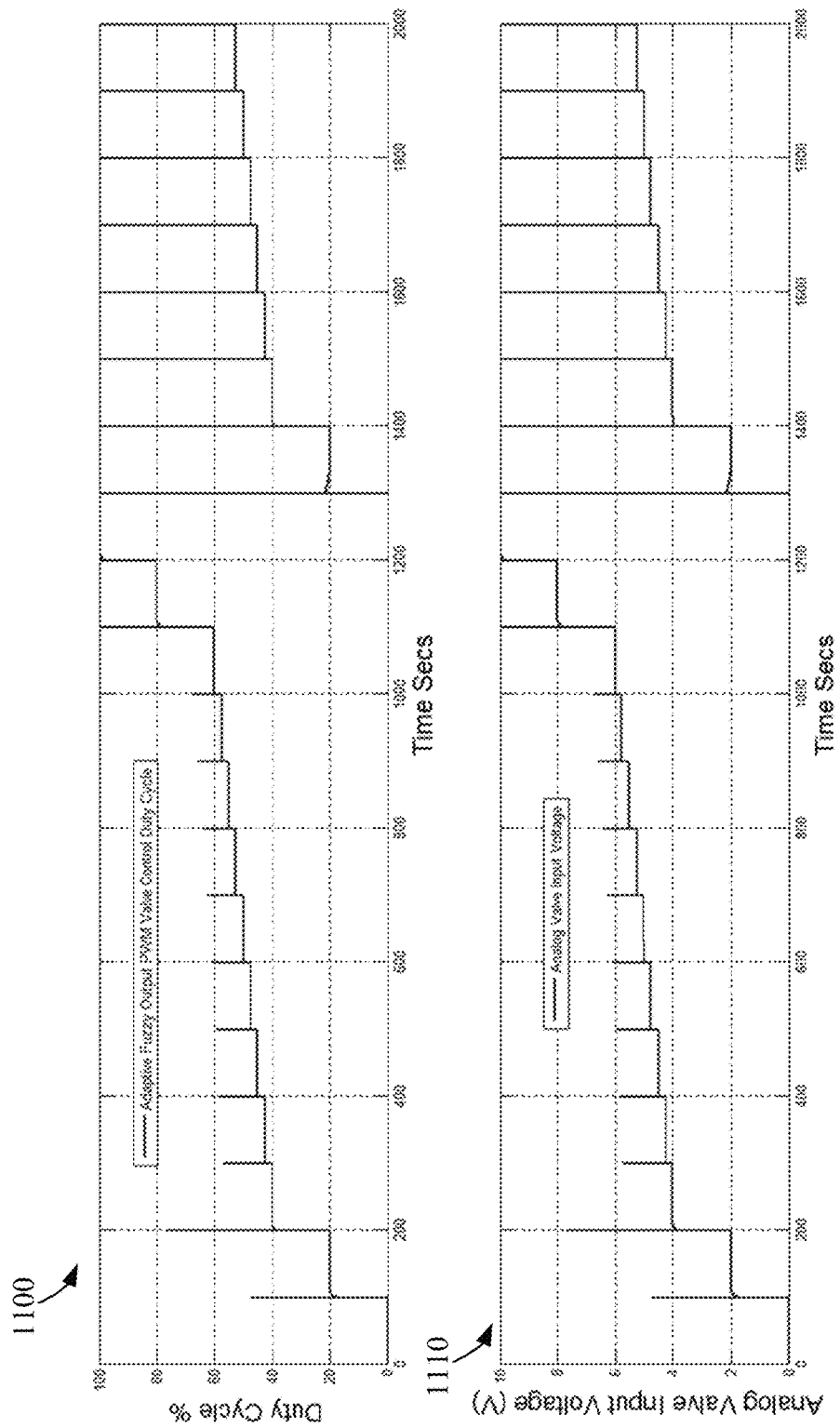
FIG. 11 is a graphical diagram of a digital pressure control value over time and analog voltage values over time using the adaptive fuzzy control system of FIGS. 6-8.

FIG. 10 depicts a graph 1000 of reductant line pressure over time for incremental pressure input values and actual pressure values using the adaptive fuzzy control system of FIGS. 6-8. The graph 1000 depicts that the actual pressure values using the adaptive fuzzy control system achieve the incremental pressure input values with minimal delay over small and moderate increments. FIG. 11 depicts a graph 1100 of a digital pressure control value (e.g., a PWM value) over time for several incremental pressure input values using the adaptive fuzzy control system of FIGS. 6-8 and a graph 1100 of analog voltage values over time for several incremental pressure input values using the adaptive fuzzy control system of FIGS. 6-8.

In some implementations, the aforementioned adaptive fuzzy logic of the self-tuning circuit 320 to control the input pressure values may also be implemented to tune EGR-valve position controllers, intake and/or exhaust throttle position controllers, etc.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims. Additionally, it is noted that limitations in the claims should not be interpreted as constituting "means plus function" limitations under the United States patent laws in the event that the term "means" is not used therein.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
   a dosing unit;
   a reductant tank in fluid communication with the dosing unit;
   a pressure sensor configured to detect an input pressure of reductant to the dosing unit from the reductant tank;
   a second sensor configured to measure a parameter indicative of an actual amount of reductant dosed by the dosing unit,
   a pressure control device to control the input pressure of reductant to the dosing unit from the reductant tank; and
   a controller coupled to the dosing unit, the pressure sensor, the second sensor, and the pressure control device, the controller including a self-tuning circuit structured to:
      select an input pressure value,
      generate a pressure control signal using an adaptive fuzzy control system based on the input pressure value, the detected input pressure, and an error amount,
      regulate the input pressure of reductant to the dosing unit from the reductant tank using the pressure control signal for the pressure control device, select a dosing command value,
command the dosing unit to dose reductant based on the dosing command value,
receive and interpret the parameter measured by the second sensor to determine the actual amount of reductant dosed by the dosing unit,
compare the actual amount of reductant dosed by the dosing unit to an expected amount of dosed reductant based on the dosing command value and the input pressure value, and
update a dosing command value of a dosing command table of the controller based on the comparison of the actual amount of reductant dosed by the dosing unit to the expected amount of dosed reductant based on the dosing command value and the input pressure value.

2. The system of claim 1, wherein the controller is operable to control dosing of reductant from the dosing unit based on the dosing command table.

3. The system of claim 1, wherein the self-tuning circuit is further structured to:
interpret a first parameter indicative of the input pressure of reductant to the dosing unit as substantially equal to the input pressure value,
command the dosing unit to dose reductant at a first dosing command rate at the input pressure value based on the dosing command value of the dosing command table.

4. The system of claim 1, wherein the adaptive fuzzy control system comprises a fuzzy inference engine and an adaption system.

5. The system of claim 1, wherein the adaptive fuzzy control system uses an updated control singleton adapted as:

$$C_i^{updated} = C_i + \mu_{A_i \cap B_{i\_delay}}(x) \times G_p(e + \lambda \dot{e}),$$

where $G_p$ is the adaptive learning gain and $\lambda$ is the adaptive learning rate.

6. The system of claim 1, wherein the self-tuning circuit is further structured to calculate the error amount based on a feedback error.

7. The system of claim 6, wherein the feedback error comprises a current error and a current rate of change of error.

8. The system of claim 7, wherein the feedback error further comprises a delayed error and a delayed rate of change of error.

9. The system of claim 1, wherein the pressure control device comprises a valve or a pump.

10. The system of claim 1, wherein the second sensor is a weight sensor configured to measure a weight of the reductant tank, including reductant therein.

11. The system of claim 1, wherein the second sensor is a flow meter sensor configured to measure a rate of volumetric flow from the reductant tank to the dosing unit.

12. The system of claim 1, wherein the second sensor is a volumetric measurement sensor configured to measure a volume of reductant in the reductant tank and/or a receiving tank.

13. A controller for use with an aftertreatment system, the aftertreatment system including a dosing unit, a reductant tank in fluid communication with the dosing unit, a second sensor configured to measure a parameter indicative of an actual amount of reductant dosed by the dosing unit, a pressure sensor configured to detect an input pressure of reductant to the dosing unit from the reductant tank, and a pressure control device to control the input pressure of reductant to the dosing unit from the reductant tank, the controller coupled to a dosing unit, the pressure sensor, the second sensor, and the pressure control device, the controller including a self-tuning circuit structured to:
select an input pressure value;
generate a pressure control signal using an adaptive fuzzy control system based on the input pressure value, the detected input pressure, and an error amount;
regulate the input pressure of reductant to the dosing unit from the reductant tank using the pressure control signal for the pressure control device;
select a dosing command value;
command the dosing unit to dose reductant based on the dosing command value;
receive and interpret the parameter measured by the second sensor to determine the actual amount of reductant dosed by the dosing unit;
compare the actual amount of reductant dosed by the dosing unit to an expected amount of dosed reductant based on the dosing command value and the input pressure value; and
update a dosing command value of a dosing command table of the controller based on the comparison of the actual amount of reductant dosed by the dosing unit to the expected amount of dosed reductant based on the dosing command value and the input pressure value.

14. The controller of claim 13, wherein the self-tuning circuit is further structured to:
interpret a first parameter indicative of the input pressure of reductant to the dosing unit as substantially equal to the input pressure value;
command the dosing unit to dose reductant at a first dosing command rate at the input pressure value based on the dosing command value of the dosing command table.

15. The controller of claim 13, wherein the adaptive fuzzy control system comprises a fuzzy inference engine and an adaption system.

16. The controller of claim 13, wherein the adaptive fuzzy control system uses an updated control singleton adapted as:

$$C_i^{updated} = C_i + \mu_{A_i \cap B_{i\_delay}}(x) \times G_p(e + \lambda \dot{e}),$$

where $G_p$ is the adaptive learning gain and $\lambda$ is the adaptive learning rate.

17. The controller of claim 13, wherein the self-tuning circuit is further structured to calculate the error amount based on a feedback error comprising a current error and a current rate of change of error.

18. The controller of claim 17, wherein the feedback error further comprises a delayed error and a delayed rate of change of error.

19. The controller of claim 13, wherein the pressure control device comprises a valve or a pump.

20. The controller of claim 13, wherein the second sensor is a weight sensor configured to measure a weight of the reductant tank, including reductant therein.

21. The controller of claim 13, wherein the second sensor is a flow meter sensor configured to measure a rate of volumetric flow from the reductant tank to the dosing unit.

22. The controller of claim 13, wherein the second sensor is a volumetric measurement sensor configured to measure a volume of reductant in the reductant tank and/or a receiving tank.

23. A method for tuning of a dosing unit using a self-tuning circuit of a controller, the method comprising:
  selecting an input pressure value;
  generating a pressure control signal using an adaptive fuzzy control system based on the input pressure value, a detected input pressure of reductant to a dosing unit from a reductant tank, and an error amount;
  regulating an input pressure of reductant to the dosing unit from the reductant tank using the pressure control signal for a pressure control device to control the input pressure of reductant to the dosing unit from the reductant tank;
  selecting a dosing command value;
  commanding the dosing unit to dose reductant based on the dosing command value;
  receiving and interpreting a parameter measured by a second sensor to determine an actual amount of reductant dosed by the dosing unit,
  comparing the actual amount of reductant dosed by the dosing unit to an expected amount of dosed reductant based on the dosing command value and the input pressure value; and
  updating a dosing command value of a dosing command table of the controller based on the comparison of the actual amount of reductant dosed by the dosing unit to the expected amount of dosed reductant based on the dosing command value and the input pressure value.

24. The method of claim 23, further comprising:
  interpreting a first parameter indicative of the input pressure of reductant to the dosing unit as substantially equal to the input pressure value;
  commanding the dosing unit to dose reductant at a dosing command rate at the input pressure value based on the dosing command value of the dosing command table stored in a computer readable storage medium of the controller configured to control dosing of reductant from the dosing unit based on the dosing command table.

25. The method of claim 23, wherein the adaptive fuzzy control system comprises a fuzzy inference engine and an adaption system.

26. The method of claim 23, wherein the adaptive fuzzy control system uses an updated control singleton adapted as:

$$C_i^{updated} = C_i + \mu_{A_i \cap B_{i\_delay}}(x) \times G_p(e + \lambda \dot{e}),$$

where $G_p$ is the adaptive learning gain and $\lambda$ is the adaptive learning rate.

27. The method of claim 23, further comprising:
  calculating the error amount based on a feedback error comprising a current error and a current rate of change of error.

28. The method of claim 27, wherein the feedback error further comprises a delayed error and a delayed rate of change of error.

29. The method of claim 23, wherein the pressure control device comprises a valve or a pump.

30. The method of claim 23, wherein the second sensor is a weight sensor configured to measure a weight of the reductant tank, including reductant therein.

31. The method of claim 23, wherein the second sensor is a flow meter sensor configured to measure a rate of volumetric flow from the reductant tank to the dosing unit.

32. The method of claim 23, wherein the second sensor is a volumetric measurement sensor configured to measure a volume of reductant in the reductant tank and/or a receiving tank.

33. A system comprising:
  a dosing unit;
  a reductant tank in fluid communication with the dosing unit;
  a pressure sensor configured to detect an input pressure of reductant to the dosing unit from the reductant tank;
  a second sensor configured to measure an actual amount of dosed reductant by the dosing unit;
  a pressure control device to control the input pressure of reductant to the dosing unit from the reductant tank; and
  a controller coupled to the dosing unit, the pressure sensor, and the pressure control device, the controller including a self-tuning circuit structured to:
    determine an input pressure value,
    generate a pressure control signal using an adaptive fuzzy control system based on the input pressure value, the detected input pressure, and an error amount,
    regulate the input pressure of reductant to the dosing unit from the reductant tank using the pressure control signal for the pressure control device,
    interpret a first parameter indicative of the input pressure of reductant to the dosing unit as substantially equal to the input pressure value,
    command the dosing unit to dose reductant at a first dosing command rate at the input pressure value based on the dosing command value of the dosing command table,
    interpret a second parameter indicative of the actual amount of dosed reductant by the dosing unit,
    compare the interpreted second parameter indicative of the actual amount of dosed reductant to an expected amount of dosed reductant based on the first dosing command rate, and
    update a dosing command value of a dosing command table of the controller in conjunction with regulating the input pressure of reductant, wherein updating the dosing command value of the dosing command table of the control module is responsive to the comparison of the interpreted second parameter indicative of the actual amount of dosed reductant to the expected amount of dosed reductant.

34. A controller for use with an aftertreatment system, the aftertreatment system including a dosing unit, a reductant tank in fluid communication with the dosing unit, a pressure sensor configured to detect an input pressure of reductant to the dosing unit from the reductant tank, a second sensor configured to measure an actual amount of dosed reductant by the dosing unit, and a pressure control device to control the input pressure of reductant to the dosing unit from the reductant tank, the controller coupled to a dosing unit, a pressure sensor, and a pressure control device, the controller including a self-tuning circuit structured to:
  determine an input pressure value;
  generate a pressure control signal using an adaptive fuzzy control system based on the input pressure value, the detected input pressure, and an error amount;
  regulate the input pressure of reductant to the dosing unit from the reductant tank using the pressure control signal for the pressure control device;

interpret a first parameter indicative of the input pressure of reductant to the dosing unit as substantially equal to the input pressure value;

command the dosing unit to dose reductant at a first dosing command rate at the input pressure value based on the dosing command value of the dosing command table;

interpret a second parameter indicative of the actual amount of dosed reductant by the dosing unit;

compare the interpreted second parameter indicative of the actual amount of dosed reductant to an expected amount of dosed reductant based on the first dosing command rate; and update a dosing command value of a dosing command table of the controller in conjunction with regulating the input pressure of reductant, wherein updating the dosing command value of the dosing command table of the control module of the aftertreatment system is responsive to the comparison of the interpreted second parameter indicative of the actual amount of dosed reductant to the expected amount of dosed reductant.

35. A method for tuning of a dosing unit using a self-tuning circuit of a controller, the method comprising:

determining an input pressure value;

generating a pressure control signal using an adaptive fuzzy control system based on the input pressure value, a detected input pressure of reductant to a dosing unit from a reductant tank, and an error amount;

regulating an input pressure of reductant to the dosing unit from the reductant tank using the pressure control signal for a pressure control device to control the input pressure of reductant to the dosing unit from the reductant tank;

interpreting a first parameter indicative of the input pressure of reductant to the dosing unit as substantially equal to the input pressure value;

commanding the dosing unit to dose reductant at a dosing command rate at the input pressure value based on the dosing command value of the dosing command table stored in a computer readable storage medium of the controller operable to control dosing of reductant from the dosing unit based on the dosing command table;

interpreting a second parameter indicative of an actual amount of dosed reductant by the dosing unit from a second sensor;

comparing the interpreted second parameter indicative of the actual amount of dosed reductant to an expected amount of dosed reductant based on the dosing command rate; and updating a dosing command value of a dosing command table of the controller in conjunction with regulating the input pressure of reductant, wherein updating the dosing command value of the dosing command table of the controller of an aftertreatment system to an updated dosing command value is responsive to the comparison of the interpreted second parameter indicative of the actual amount of dosed reductant to the expected amount of dosed reductant.

* * * * *